United States Patent
Pena Casimiro et al.

(10) Patent No.: US 9,701,266 B2
(45) Date of Patent: Jul. 11, 2017

(54) WATER COLLECTION SYSTEM FOR A PICKUP TRUCK

(71) Applicant: Ford Global Technologies, LLC, Dearborn, MI (US)

(72) Inventors: Jesus Alejandro Pena Casimiro, Naucalpan (MX); Jose Humberto Gutierrez, Naucalpan de Jaurez (MX); Juan Pablo Rios Rendon, Mexico City (MX); Gabriel Horta, Estado de Mexico (MX); Norberto Mondragon, Tiahuac (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/967,782

(22) Filed: Dec. 14, 2015

(65) Prior Publication Data

US 2017/0166149 A1    Jun. 15, 2017

(51) Int. Cl.
  *B62D 33/00* (2006.01)
  *B60R 19/20* (2006.01)
  *B62D 33/02* (2006.01)

(52) U.S. Cl.
  CPC ............. *B60R 19/20* (2013.01); *B62D 33/02* (2013.01)

(58) Field of Classification Search
  CPC .......... C08L 83/00; C08L 83/04; C08L 83/12; C09D 183/04; C09D 183/12; B60R 13/01; B60R 11/06; B60P 3/42; B60P 7/0807; B61D 45/001
  USPC ............ 296/183.1, 10, 37.6, 39.2; 280/834; 224/403, 404, 405, 542
  See application file for complete search history.

(56) References Cited

U.S. PATENT DOCUMENTS

| | | | | |
|---|---|---|---|---|
| 3,501,170 A | * | 3/1970 | Da Valle | B60D 1/02 280/500 |
| 3,881,768 A | * | 5/1975 | Nix | B62D 33/02 296/39.2 |
| 4,613,183 A | * | 9/1986 | Kesling | B62D 33/02 296/183.1 |
| 4,674,782 A | * | 6/1987 | Helber | B60R 19/48 224/401 |
| 4,893,856 A | * | 1/1990 | Council | B60D 1/06 293/106 |

(Continued)

FOREIGN PATENT DOCUMENTS

CN    201506306 U    6/2010
CN    201863807 U    6/2011

(Continued)

*Primary Examiner* — Kiran B Patel
(74) *Attorney, Agent, or Firm* — Jason Rogers; Brooks Kushman P.C.

(57) ABSTRACT

A pickup truck rear end assembly is provided. The assembly may include a truck bed, a truck box, and a bumper. The truck box may be mounted to the bed and define a cavity therein. The bumper may define a reservoir, a reservoir inlet port open to the cavity, and a reservoir outlet port accessible from an exterior of the vehicle. The cavity and reservoir may be arranged with one another such that water entering the cavity passes through to the reservoir via the inlet port. The truck bed may define a gutter adjacent to the inlet port and arranged with the inlet port to direct water thereto. A strainer may be disposed within the inlet port. A filter may be disposed between the inlet port and reservoir.

14 Claims, 3 Drawing Sheets

(56) References Cited

U.S. PATENT DOCUMENTS

| | | | | |
|---|---|---|---|---|
| 4,896,910 A * | 1/1990 | Carter | ............... | B60D 1/56 224/402 |
| 4,944,612 A * | 7/1990 | Abstetar | ............... | B60R 13/01 296/39.2 |
| 4,958,876 A * | 9/1990 | Diaco | ............... | B60R 13/01 296/39.2 |
| 4,961,604 A * | 10/1990 | Kisner | ............... | B60P 1/5495 212/180 |
| 5,016,932 A * | 5/1991 | Carter | ............... | B60R 19/48 224/489 |
| 5,135,274 A * | 8/1992 | Dodd | ............... | B60R 19/48 224/491 |
| 5,221,119 A * | 6/1993 | Emery | ............... | B60R 13/01 220/495.01 |
| 5,288,124 A * | 2/1994 | Ward | ............... | B60P 3/42 296/24.43 |
| 5,364,142 A * | 11/1994 | Coiner | ............... | B60R 19/52 293/106 |
| 5,685,593 A * | 11/1997 | O'Connor | ............... | B60R 13/01 224/404 |
| 5,823,585 A * | 10/1998 | Tanguay | ............... | B60R 19/48 293/106 |
| 5,988,723 A * | 11/1999 | Adkins | ............... | B60R 13/01 296/39.2 |
| 6,015,177 A * | 1/2000 | Tijerina | ............... | B60P 1/36 224/281 |
| 6,089,478 A * | 7/2000 | Truan | ............... | E01C 19/203 239/661 |
| 6,234,559 B1 * | 5/2001 | Block | ............... | B60J 7/1621 296/100.06 |
| 6,598,914 B1 * | 7/2003 | Dixon | ............... | B60K 11/04 293/106 |
| 7,607,677 B1 * | 10/2009 | Bosak | ............... | B60D 1/485 280/420 |
| 2009/0096239 A1 * | 4/2009 | Martin | ............... | B60R 9/00 296/37.6 |
| 2012/0043773 A1 * | 2/2012 | Lucas | ............... | B60L 11/1877 293/106 |
| 2013/0087591 A1 * | 4/2013 | Cha | ............... | B60R 3/02 224/496 |
| 2013/0206266 A1 | 8/2013 | Stenhouse | | |

FOREIGN PATENT DOCUMENTS

| | | |
|---|---|---|
| CN | 102182224 A | 9/2011 |
| CN | 202519738 U | 11/2012 |
| EP | 2786885 A1 | 10/2014 |

* cited by examiner

WATER COLLECTION SYSTEM FOR A PICKUP TRUCK

TECHNICAL FIELD

The present disclosure relates to pickup truck assemblies and systems to collect liquids such as water.

BACKGROUND

Pickup trucks are motor vehicles with a front passenger area, often referred to as a cab, and an open top rear cargo area, often referred to as a box. The box usually has a substantially flat bed from which two side body panels and a forward interconnecting header extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in many different ways, including carrying a variety of types of cargo and towing various types of trailers.

SUMMARY

A pickup truck rear end assembly includes a truck bed, a truck box, and a bumper. The truck box is mounted to the bed and defines a cavity therein. The bumper defines a reservoir, a reservoir inlet port open to the cavity, and a reservoir outlet port accessible from an exterior of the truck. The cavity and reservoir are arranged with one another such that water entering the cavity passes through to the reservoir via the inlet port. The truck bed may define a gutter adjacent to the inlet port and arranged with the inlet port to direct water thereto. A strainer may be disposed within the inlet port. A filter may be disposed between the inlet port and reservoir. The assembly may include a sensor disposed within the reservoir and in communication with a controller to monitor an amount of water within the reservoir. An air relief outlet may be open to the reservoir. A valve may be included at the outlet port to selectively control an amount of water discharge from the reservoir.

A water collection system for a pickup truck includes a truck frame, a truck bed, a truck box, and a container. The truck bed is mounted to the truck frame and defines a bed outlet port at a rear of the truck bed. The truck box is mounted to the truck bed and defines a cavity open to receive water. The container is disposed at a rear end of the truck, beneath the truck bed, and defines container inlet port in fluid communication with the cavity via the bed outlet port and an exhaust port. The cavity and container are arranged with one another such that water entering the cavity passes through to the container via the bed outlet port. The water collection system may include a valve at the exhaust port to selectively release water contained within the container. A water filtration system may be disposed between the bed outlet port and the container. The water filtration system may include a filter concealed by one of a fascia or a bumper. The truck bed may further define another bed outlet port spaced apart from the bed outlet port such that the bed outlet ports are at opposite ends of the truck bed. The truck bed may be formed such that gravity directs water contacting the truck bed toward the bed outlet port. The container may be mounted to the pickup truck rearward of a rear wheel.

A pickup truck includes a truck bed, a truck box, a storage tank, and a water filtration system. The truck box is mounted to the truck bed and defines a cavity. The storage tank has a valve arranged to control release of liquid received within the cavity into the storage tank. The water filtration system is disposed between, and in fluid communication with, the cavity and storage tank. Walls of the storage tank may be defined by a bumper. The water filtration system may include a strainer at a pass-through open to the cavity and a filter downstream of the pass-through. An air relief valve may be open to the storage tank. The storage tank may be mounted at a location on the truck adjacent a rear bumper of the truck. The storage tank may be arranged with the truck bed such that water stored within the storage tank dissipates energy from a rear impact with the truck.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
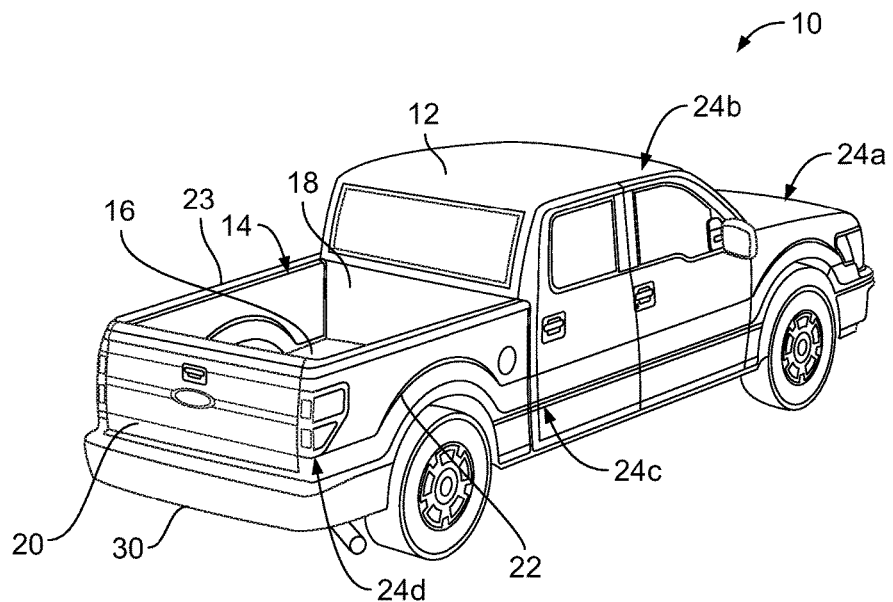
FIG. 1 is a rear perspective view of a vehicle.
Figure 2:
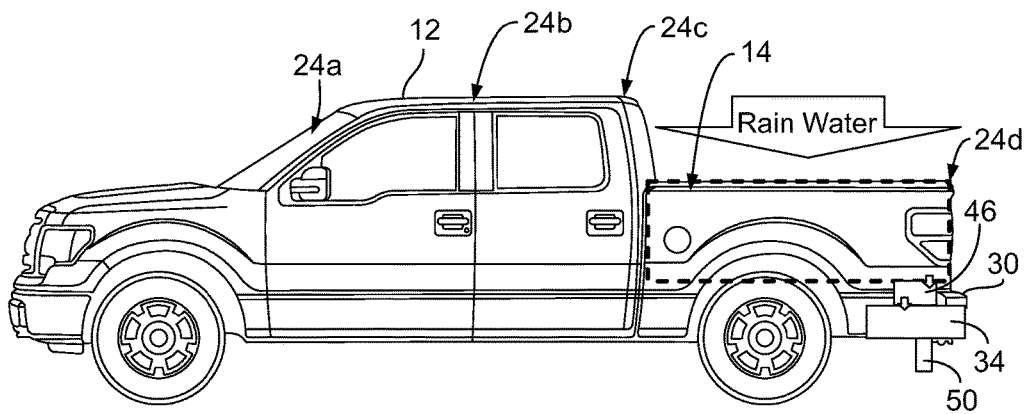
FIG. 2 is a side view of a vehicle with an overlaid illustrative portion showing a portion of a water collection system.

Referring to FIGS. 1 and 2, an example of a vehicle 10 is shown which may include a cabin 12 and a truck box 14 supported by a vehicle chassis (not shown). The vehicle 10 may be, for example, a pickup truck. The truck box 14 includes a bed 16 having a forward end adjacent to the cabin 12 and a rear end opposite the forward end. The bed 16 supports a header 18 at the forward end and a tailgate 20 at the rear end. The tailgate 20 is mounted to the bed 16 for rotation. The bed 16 may also support a first body side panel 22 and a second body side panel 23. In this example, the vehicle 10 may include an A-pillar region 24a, a B-pillar region 24b, a C-pillar region 24c, and a D-pillar region 24d. The illustrated vehicle 10 is a four door configuration; however other configurations, such as a two door configuration, may be adopted to incorporate the disclosed concepts. Alternate configurations may include different pillar region references than as described for the vehicle 10. The first body side panel 22 and the second body side panel 23 may be secured to the header 18 at respective regions referred to as forward box pillar regions of the truck box 14 or the C-pillar regions 24c herein. The first body side panel 22 and the second body side panel 23 may each include fascia portions. The tailgate 20 rotates from at least an open position to a closed position. In the closed position as shown in FIGS. 1 and 2, each lateral end of the tailgate 20 may be removably attached to the first body side panel 22 and the second body side panel 23 at respective regions referred to as rear box pillar regions or the D-pillar regions 24d herein. A bumper 30 is mounted to the frame of the vehicle 10 and disposed at a rear of the vehicle 10.

A cavity may be defined by the truck box 14 and/or the bed 16. For example, the header 18, the tailgate 20, the first body side panel 22, the second body side panel 23, and the bed 16 may define a cavity therebetween. The cavity may me open and may receive water under certain conditions, such as rain water.

Figure 3:
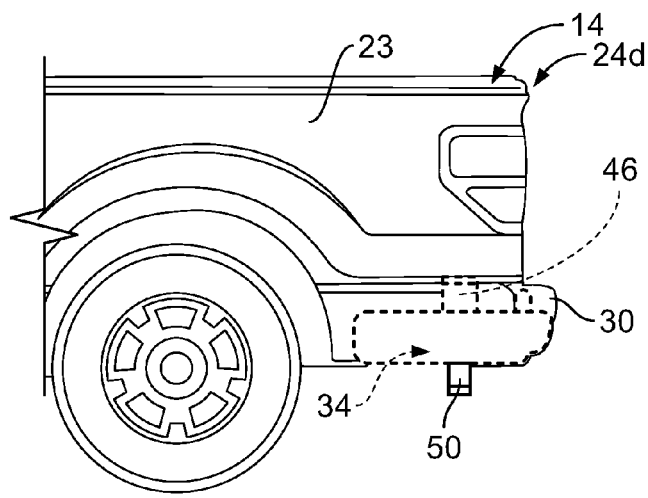
FIG. 3 is a partial side view of the vehicle of FIG. 2.
Figure 4:
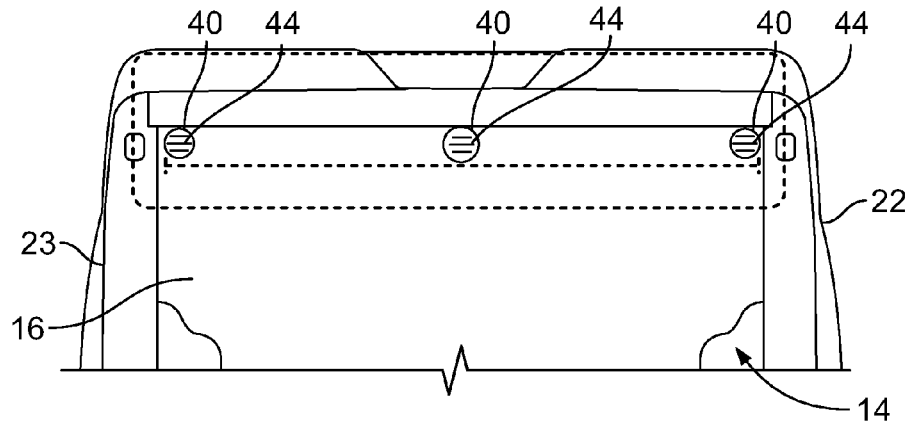
FIG. 4 is a partial rear view of the vehicle of FIG. 2.
Figure 5:
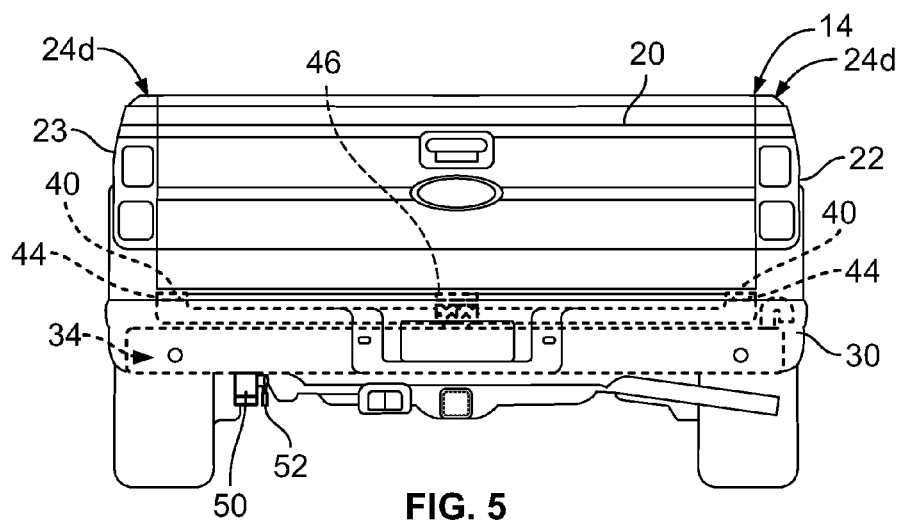
FIG. 5 is a partial top view of the vehicle of FIG. 2.

Referring additionally to FIGS. 3 through 4, an example of a water collection system is shown. The water collection system may include the cavity defined by the truck box 14 and/or the bed 16. The water collection system may be mounted to a vehicle, such as the vehicle 10, and include a reservoir, container or tank. For example, the bumper 30 may define a reservoir 34 therein. Alternatively, a container may be mounted to the vehicle 10 adjacent the bumper 30. One or more ports 40 provide fluid communication between the cavity and the reservoir 34. For example, the bed 16 may define ports in substantial registration with other ports defined by the bumper 30 such that water may pass from the cavity to the reservoir 34. Water stored within the reservoir 34 may also assist in dissipating energy when the vehicle 10 receives a rear impact. For example, the reservoir 34 may be arranged with the truck bed 16 such that water stored within the reservoir 34 is at a location on the vehicle 10 to dissipate energy from a rear impact with the vehicle 10.

The water collection system may also include a filtration system and a distribution system. For example, the filtration system may include a strainer 44 and a filter 46. The strainer 44 may be mounted at one of the one or more ports 40 to assist in preventing debris from entering the reservoir 34. It is contemplated that additional components, such as a second strainer may be used with the system to assist in preventing debris from entering the reservoir. For example, the second strainer may be structured to prevent small debris, such as insects, from entering the reservoir 34. The filter 46 may be downstream of the one or more ports 40 and assist in filtering water passing therethrough. The filter 46 may be accessible for cleaning and replacement purposes. For example, one of the one or more ports 40 may be open to the filter 46. The filtration system may operate to cleanse water prior to entering to the reservoir 34 via a port 48.

The distribution system may be in fluid communication with the reservoir 34 and the filtration system and may include an outlet 50 and a valve control 52. The valve control 52 may selectively control output of liquid from the reservoir 34 via the outlet 50. For example, water stored within the reservoir 34 may be used to wash the vehicle 10, to water a garden, or other similar applications.

Figure 6:
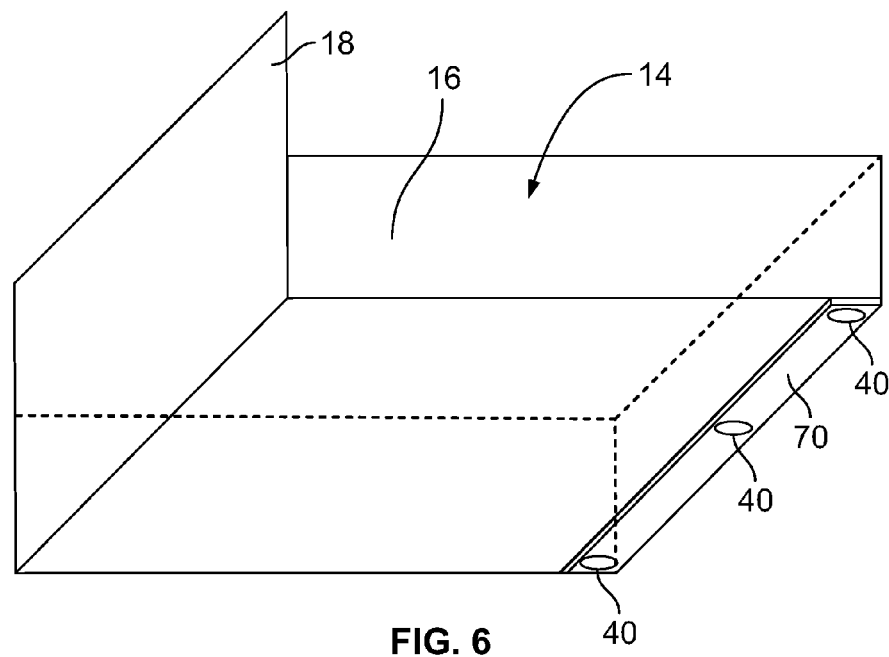
FIG. 6 is a schematic view of an example of a pickup truck box and a portion of a water collection system.
Figure 7:
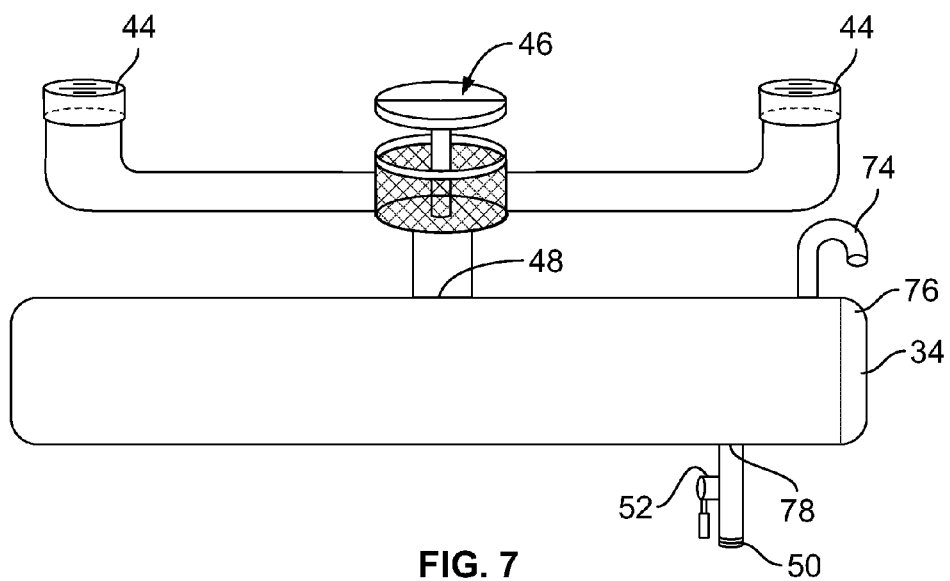
FIG. 7 is a schematic view of an example of a portion of a water collection system for a pickup truck box.

FIGS. 6 and 7 show a schematic example of a truck box, such as truck box 14, and a water collection system as described above. In this example, the truck bed 16 is shown defining a gutter 70. The gutter 70 may be formed to influence a flow of liquid toward the one or more ports 40. An air relief pipe 74 may be open to the reservoir 34 and include a screen to prevent entrance therein. The air relief pipe 74 may assist in preventing undesirable pressure within the reservoir 34. A sensor 76 may be disposed within the reservoir 34 to identify an amount of liquid therein. The sensor 76 may, for example, be in communication with a controller (not shown) and a indicia located in, for example, the vehicle cabin 12 to monitor and output a signal indicating a water level within the reservoir.

Water may enter the cavity of the truck box 14 and flow to the one or more ports 40. In another example, the bed 16 may define gutters (not shown) extending along a base of the first body side panel 22 or the second body side panel 23. The one or more ports 40 may be in substantial registration with the respective strainer 44 and/or the filter 46. Water may flow through the strainers 44 and filter 46 enroute to the reservoir 34 via the port 48. Water may then be discharged through a port 78 and the outlet 50 as selectively controlled by the valve control 52.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A pickup truck rear end assembly comprising:
   a truck bed;
   a truck box mounted to the bed and defining a cavity therein; and
   a bumper defining a reservoir, a reservoir inlet port open to the cavity, and a reservoir outlet port accessible from an exterior of the truck,
   wherein the cavity and reservoir are arranged with one another such that water entering the cavity passes through to the reservoir via the inlet port.

2. The assembly of claim 1, wherein the truck bed defines a gutter adjacent to the inlet port and arranged with the inlet port to direct water thereto.

3. The assembly of claim 1, further comprising a strainer disposed within the inlet port.

4. The assembly of claim 1, further comprising a filter disposed between the inlet port and reservoir.

5. The assembly of claim 1, further comprising a sensor disposed within the reservoir and in communication with a controller to monitor an amount of water within the reservoir.

6. The assembly of claim 1, further comprising an air relief outlet open to the reservoir.

7. The assembly of claim 1, further comprising a valve at the outlet port to selectively control an amount of water discharge from the reservoir.

8. A pickup truck rear end assembly comprising:
   a truck frame;

a truck bed mounted to the frame and defining a bed outlet port at a rear of the bed;

a truck box mounted to the bed and defining a cavity open to receive water; and a container disposed at a rear end of the truck, beneath the bed, and defining a container inlet port in fluid communication with the cavity via the bed outlet port and an exhaust port, wherein the cavity and container are arranged with one another such that water entering the cavity passes through to the container via the bed outlet port.

9. The assembly of claim 8, further comprising a valve at the exhaust port to selectively release water contained within the container.

10. The assembly of claim 8, further comprising a water filtration system disposed between the bed outlet port and the container.

11. The assembly of claim 10, wherein the water filtration system comprises a filter concealed by one of a fascia or a bumper.

12. The assembly of claim 8, wherein the bed further defines another bed outlet port spaced apart from the bed outlet port such that the bed outlet ports are at opposite ends of the truck bed.

13. The assembly of claim 8, wherein the truck bed is formed such that gravity directs water contacting the truck bed toward the bed outlet port.

14. The assembly of claim 8, wherein the container is mounted to the pickup truck rearward of a rear wheel.

\* \* \* \* \*